(12) United States Patent
Xie

(10) Patent No.: US 8,934,454 B2
(45) Date of Patent: Jan. 13, 2015

(54) METHOD AND SYSTEM FOR SWITCHING CIRCUIT SWITCH DOMAIN SERVICE TO PACKET SWITCH DOMAIN

(75) Inventor: Zhenhua Xie, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 176 days.

(21) Appl. No.: 13/876,698

(22) PCT Filed: Jan. 24, 2011

(86) PCT No.: PCT/CN2011/070544
§ 371 (c)(1),
(2), (4) Date: Mar. 28, 2013

(87) PCT Pub. No.: WO2012/041026
PCT Pub. Date: Apr. 5, 2012

(65) Prior Publication Data
US 2013/0188606 A1 Jul. 25, 2013

(30) Foreign Application Priority Data

Sep. 28, 2010 (CN) .......................... 2010 1 0297853

(51) Int. Cl.
*H04W 36/14* (2009.01)
*H04W 36/00* (2009.01)
*H04W 76/02* (2009.01)

(52) U.S. Cl.
CPC .............. *H04W 36/14* (2013.01); *H04W 76/02* (2013.01); *H04W 36/0022* (2013.01)
USPC ............................. 370/331; 370/332; 455/436

(58) Field of Classification Search
CPC . H04W 36/14; H04W 36/0022; H04W 76/02; H04W 80/10; H04L 65/103; H04L 65/1016; H04L 65/104; H04L 65/1083
USPC .................................. 370/331–338; 455/436
See application file for complete search history.

(56) References Cited

U.S. PATENT DOCUMENTS 7,522,585 B2   4/2009 Liu et al.
8,509,781 B2 * 8/2013 Zou et al. ...................... 455/436
(Continued)

FOREIGN PATENT DOCUMENTS

CN    101400090 A    4/2009
CN    101574007 A    11/2009
(Continued)

OTHER PUBLICATIONS

Supplementary European Search Report in European application No. 11827922.3, mailed on Nov. 7, 2013.
(Continued)

*Primary Examiner* — Afsar M Qureshi
(74) *Attorney, Agent, or Firm* — Oppedahl Patent Law Firm LLC

(57) ABSTRACT

The disclosure discloses a method for switching a circuit switch domain service to a packet switch domain, configuring an HO-Proxy for handover to a PS domain of a target network, the method includes that: a service network base station system sends a CS domain service handover request for a UE to the HO-Proxy when the service network base station system determines to switch a CS domain service of the UE to the PS domain of the target network; and the HO-Proxy requests a target network control entity to switch the CS domain service of the UE to the PS domain of the target network, or switches the CS domain service of the UE to the PS domain of the target network. The disclosure further discloses a system for implementing the method. In the disclosure, when used for switching a CS domain service to a PS network, the HO-Proxy can preserve accurately the PS bearer resource for a corresponding (CS or PS domain) service of the UE, thereby implementing accurate and timely handover.

17 Claims, 2 Drawing Sheets

(56) References Cited

U.S. PATENT DOCUMENTS

| | | | |
|---|---|---|---|
| 8,681,737 B2* | 3/2014 | Chen et al. | 370/331 |
| 2003/0165124 A1* | 9/2003 | Alperovich et al. | 370/331 |
| 2007/0058791 A1* | 3/2007 | Liu et al. | 379/88.17 |
| 2008/0020745 A1* | 1/2008 | Bae et al. | 455/422.1 |
| 2008/0305799 A1* | 12/2008 | Zuniga et al. | 455/437 |
| 2009/0207807 A1 | 8/2009 | Mahdi et al. | |
| 2010/0067493 A1* | 3/2010 | Mahdi | 370/332 |
| 2010/0215018 A1* | 8/2010 | Ejzak | 370/331 |
| 2011/0164564 A1* | 7/2011 | Vedrine et al. | 370/328 |

FOREIGN PATENT DOCUMENTS

| | | | |
|---|---|---|---|
| JP | 2002118868 A | 4/2002 |
| JP | 2008535352 A | 8/2008 |
| JP | 2010531082 A | 9/2010 |
| WO | 2007144732 A2 | 12/2007 |
| WO | 2008081310 A9 | 7/2008 |
| WO | 2008157461 A1 | 12/2008 |

OTHER PUBLICATIONS

"3rd Generation Partnership Project; Technical Specification Group Services and System Aspects; 3GPP System Architecture Evolution: Report on Technical Options and Conclusions (Release 8)", 3GPP Standard; 3GPP TR 23.882, 3rd Generation Partnership Project (3GPP), Mobile Competence Centre,650, Route Des Lucioles, F-06921 Sophia-Antipolis Cedex, France, Sep. 16, 2008. See Supplementary European Search Report for relevant pages.

Alcatel-Lucent: "SR-VCC: brief comparison and way forward", 3GPP Draft; 82-074416 SR-VCC Comparison Final, 3rd Generation Partnership Project (3GPP), Mobile Competence Centre, 650, Route Des Lucioles, F-06921 Sophia-Antipolis Cedex, France, vol. SA WG2, no. Kobe, Japan, Oct. 4, 2007. See Supplementary European Search Report for relevant pages.

International Search Report in international application No. PCT/CN2011/070544, mailed on Jul. 7, 2011.

English Translation of the Written Opinion of the International Search Authority in international application No. PCT/CN2011/070544, mailed on Jul. 7, 2011.

* cited by examiner

METHOD AND SYSTEM FOR SWITCHING CIRCUIT SWITCH DOMAIN SERVICE TO PACKET SWITCH DOMAIN

TECHNICAL FIELD

The disclosure relates to handover technology for handover of a User Equipment (UE) with a Circuit Switch (CS) domain service from a non-Packet Switch (PS) network to a PS network, in particular to a method and a system for switching a user from a CS domain to a PS domain in an IP Multimedia Core Network Subsystem (IMS).

BACKGROUND

The IMS is an IP-based network architecture proposed by the 3rd Generation Partnership Project (3GPP), which constructs an open and flexible service environment, supports multimedia applications, and can provide rich multimedia services for a user.

In an IMS service hierarchy, a control layer is separate from a service layer, and the control layer does not provide any specific service, but only provides the service layer with necessary functions such as triggering, routing, charging, and the like.

The service triggering and controlling functions in the control layer are performed by a Call Session Control Function (CSCF). There are mainly three types of CSCF, namely, Proxy-CSCF (P-CSCF), Interrogating-CSCF (I-CSCF), and Serving-CSCF (S-CSCF), wherein the S-CSCF is required, while the I-CSCF is optional.

The service layer consists of a series of Application Servers (AS) and can provide a specific service, wherein the ASs can be independent entities or exist in the S-CSCF.

The control layer (S-CSCF) controls service triggering according to subscription information of a user to invoke a service on an AS to implement a service function.

The end-to-end equipment in a session is called a UE, and is responsible for interaction with the user of the UE. The UE has multiple ways to access a network, including: accessing via a 3GPP PS domain, or accessing via another non-3GPP PS domain, or even accessing via a CS domain, etc. When an IMS user connects from a CS domain and initiates a call, the call signaling thereof needs to be routed to an IMS domain home to the user, so as to provide a service to the user.

If at a certain moment, the UE can only use either a CS domain or a PS domain, instead of simultaneously using both, for providing a voice service, a handover to the PS domain occurs when the UE uses the CS domain for providing the voice service, and when it is required to provide the voice service using the PS domain, it is called a Reverse Single Radio Voice Call Continuity (RSRVCC).

As a UE may still use a PS domain for providing another non-voice service when using the CS domain for providing the voice service, a PS domain non-voice service handover may still occur while the RSRVCC occurs. As services are provided to the UE at a source network respectively by a CS domain and a PS domain, and after handover, services are provided to the UE only by a PS domain in a target network, it certainly is necessary to synchronize CS handover and PS handover at the time of handover, namely, to synchronize handover from a CS domain to a PS domain, and that from a PS domain to a PS domain.

SUMMARY

Accordingly, the primary objective of the present disclosure is to provide a method and a system for switching a circuit switch domain service to a packet switch domain, such that a CS domain service of a UE in a non-PS network can be switched over to a PS network accurately and promptly.

To achieve the aforementioned objective, the technical solution of the disclosure is implemented as follows.

A method for switching a circuit switch domain service to a packet switch domain, configuring a handover proxy (HO-Proxy) for handover to a Packet Switch (PS) domain of a target network, includes:

sending, by a service network base station system, a Circuit Switch (CS) domain service handover request for a User Equipment (UE) to the HO-Proxy when the service network base station system determines to switch a CS domain service of the UE to the PS domain of the target network; and requesting, by the HO-Proxy, a target network control entity to switch the CS domain service of the UE over to the PS domain of the target network, or switching, by the HO-Proxy, the CS domain service of the UE to the PS domain of the target network.

Preferably, the method may further include: before the service network base station system determines to switch the CS domain service of the UE to the PS domain of the target network, establishing, by the UE, a bearer at a service network or the target network via an IP Multimedia Core Network Subsystem (IMS), or initiating, by the UE, a session, or establishing, by the UE, a bearer directly at the service network or the target network.

Preferably, the method may further include: before the HO-Proxy requests the target network control entity to switch the CS domain service of the UE to the PS domain of the target network, or the HO-Proxy switches the CS domain service of the UE to the PS domain of the target network, associating, by the HO-Proxy, a PS domain service handover request for the UE with the CS domain service handover request for the UE.

Preferably, the CS domain service handover request for the UE may carry identifying information indicating whether the UE has a PS domain service.

Preferably, the method may further include:

sending, by the service network base station system, a PS domain service handover request for the UE to the HO-Proxy when the UE further has a PS domain service; and requesting, by the HO-Proxy, the target network control entity to switch the CS domain service and the PS domain service of the UE to the PS domain of the target network, or switching, by the HO-Proxy, the CS domain service and the PS domain service of the UE to the PS domain of the target network.

Preferably, the method may further include:

carrying identifying information indicating that the UE has a CS domain service in the PS domain service handover request for the UE sent by the service network base station system.

Preferably, associating, by the HO-Proxy, the PS domain service handover request for the UE with the CS domain service handover request for the UE specifically may be:

when the HO-Proxy receives the PS domain service handover request for the UE first, determining, by the HO-Proxy, that the UE further has a CS domain service.

Preferably, associating, by the HO-Proxy, the PS domain service handover request for the UE with the CS domain service handover request for the UE specifically may be:

when the HO-Proxy receives the PS domain service handover request for the UE first, determining, by the HO-Proxy, that the UE further has a CS domain service according to the identifying information indicating that the UE has a CS domain service in the PS domain service handover request; or when the HO-Proxy receives the CS domain service handover request for the UE first, determining, by the HO-Proxy, whether the UE further has a PS domain service according to the identifying information indicating whether the UE has a PS domain service in the CS domain service handover request.

Preferably, associating, by the HO-Proxy, the PS domain service handover request for the UE with the CS domain service handover request for the UE specifically may be:

when the HO-Proxy receives the CS domain service handover request for the UE, determining, by the HO-Proxy, whether the UE further has a PS domain service according to the identifying information indicating whether the UE has a PS domain service in the CS domain service handover request.

Preferably, sending, by the service network base station system, the Circuit Switch (CS) domain service handover request for the UE to the HO-Proxy specifically may be:

making, by the service network base station system, the CS domain service handover request carry information that can be associated with the HO-Proxy, and sending, by the service network base station system, the CS domain service handover request; or sending, by the service network base station system, the CS domain service handover request to the HO-Proxy; or sending, by the service network base station system, the CS domain service handover request to a service network Mobile Switching Center (MSC), and sending, by the service network MSC, a CS domain service handover request to the HO-Proxy.

Preferably, sending, by the service network base station system, the PS domain service handover request and the CS domain service handover request for the UE to the HO-Proxy specifically may be:

making, by the service network base station system, the CS domain service handover request and the PS domain service handover request carry information that can be associated with the HO-Proxy, and sending, by the service network base station system, the CS domain service handover request and/or the PS domain service handover request; or sending, by the service network base station system, the CS domain service handover request to the HO-Proxy, sending, by the service network base station system, the PS domain service handover request to a service network Serving GPRS (General Packet Radio Service) support node (SGSN), and sending, by the service network SGSN, a PS domain service handover request to the HO-Proxy; or sending, by the service network base station system, the CS domain service handover request to a service network Mobile Switching Center (MSC), sending, by the service network MSC, a CS domain service handover request to the HO-Proxy, and sending, by the service network base station system, the PS domain service handover request to the HO-Proxy.

Preferably, switching, by the HO-Proxy, the CS domain service of the UE to the PS domain of the target network specifically may be:

when the UE does not have a PS domain service, inquiring, by the HO-Proxy, about bearer information from the target network control entity or a service network Serving GPRS (General Packet Radio Service) support node (SGSN) that establishes the bearer for the UE, executing, by the HO-Proxy, a PS domain handover operation, and using, by the HO-Proxy, the bearer established by the UE to serve a service of the UE originally in the CS domain; or when the UE has a PS domain service, executing, by the HO-Proxy, a PS handover operation, and using, by the HO-Proxy, the bearer established by the UE to serve a service of the UE originally in the CS domain.

Preferably, the target network control entity may be a Mobility Management Entity (MME) or a Serving GPRS (General Packet Radio Service) support node (SGSN), and the HO-Proxy may be a Mobile Switching Center (MSC) or an SGSN or a target network control entity.

A system for switching a circuit switch domain service to a packet switch domain, includes a service network base station system, a target network control entity, and a handover proxy (HO-Proxy) for handover to a Packet Switch (PS) domain of a target network, wherein the service network base station system is configured to generate a Circuit Switch (CS) domain service handover request for a User Equipment (UE) and send the CS domain service handover request to the HO-Proxy when the service network base station system determines to switch a CS domain service of the UE to the PS domain of the target network; and the HO-Proxy is configured to request, after receiving the CS domain service handover request from the UE, a target network control entity to switch the CS domain service of the UE to the PS domain of the target network, or switch the CS domain service of the UE to the PS domain of the target network.

Preferably, the system may further include a UE configured to: before the service network base station system determines to switch the CS domain service of the UE to the PS domain of the target network, establish a bearer at a service network or the target network via an IP Multimedia Core Network Subsystem (IMS), or initiate an IMS session, or establish a bearer directly at the service network or the target network.

Preferably, the HO-Proxy may be further configured to: associate a PS domain service handover request for the UE with the CS domain service handover request for the UE before requesting the target network control entity to switch the CS domain service of the UE to the PS domain of the target network, or switch the CS domain service of the UE to the PS domain of the target network.

Preferably, the service network base station system may be further configured to make the CS domain service handover request for the UE carry identifying information indicating whether the UE has a PS domain service.

Preferably, when the UE further has a PS domain service, the service network may be further configured to send a PS domain service handover request for the UE to the HO-Proxy; and the HO-Proxy further requests the target network control entity to switch the CS domain service and the PS domain service of the UE over to the PS domain of the target network, or further switch the CS domain service and the PS domain service of the UE over to the PS domain of the target network.

Preferably, the PS domain service handover request for the UE sent by the service network base station system may carry identifying information indicating that the UE has a CS domain service.

Preferably, the HO-Proxy may be further configured to: when the HO-Proxy receives the PS domain service handover request for the UE, determine that the UE further has a CS domain service.

Preferably, the HO-Proxy may be further configured to: when the HO-Proxy receives the PS domain service handover request for the UE, determine that the UE further has a CS domain service according to the identifying information indicating that the UE has a CS domain service in the PS domain service handover request.

Preferably, the HO-Proxy may be further configured to: when the HO-Proxy receives the CS domain service handover request for the UE, determine whether the UE further has a PS domain service according to identifying information indicating whether the UE has a PS domain service in the CS domain service handover request.

Preferably, the service network base station system may be further configured to make the CS domain service handover request carry information that can be associated with the HO-Proxy, and send the CS domain service handover request; or send the CS domain service handover request to the HO-Proxy; or send the CS domain service handover request to a service network Mobile Switching Center (MSC), which sends a CS domain service handover request to the HO-Proxy.

Preferably, the service network base station system may be further configured to make the CS domain service handover request and the PS domain service handover request carry information that can be associated with the HO-Proxy, and send the CS domain service handover request and/or the PS domain service handover request; or send the CS domain service handover request to the HO-Proxy, and send the PS domain service handover request to a service network Serving GPRS (General Packet Radio Service) support node (SGSN), which sends a PS domain service handover request to the HO-Proxy; or send the CS domain service handover request to a service network Mobile Switching Center (MSC), which sends a CS domain service handover request to the HO-Proxy; and send the PS domain service handover request to the HO-Proxy.

Preferably, when the UE does not have a PS domain service, the HO-Proxy may further inquire about bearer information from the target network control entity or a service network Serving GPRS (General Packet Radio Service) support node (SGSN) that establishes the bearer for the UE, executes a PS domain handover operation, and uses the bearer established by the UE to serve a service of the UE originally in the CS domain; or when the UE has a PS domain service, the HO-Proxy further executes a PS handover operation, and uses the bearer established by the UE to serve a service of the UE originally in the CS domain.

In the disclosure, when a service network determines that a UE with a CS domain service needs to be switched over to a PS network, the service network will forward a CS domain service handover request and/or a PS domain service handover request to a HO-Proxy, which requests a target network control entity to switch the CS domain service to the PS network, or switch the CS domain service to the PS network. In other words, the disclosure handles the handover of a CS domain service to a PS network via an HO-Proxy, which may be located in the target network control entity or an MSC or an SGSN. When used for switching a CS domain service to a PS network, the HO-Proxy can preserve accurately the PS bearer resources for a corresponding (CS or PS domain) service of the UE, thereby implementing accurate and timely handover.

DETAILED DESCRIPTION

The basic idea of the present disclosure is that when a service network determines that a UE with a CS domain service needs to be switched over to a PS network, the service network will forward a CS domain service handover request and/or a PS domain service handover request to an HO-Proxy, which executes a handover of the CS domain service to the PS network.

To further manifest the objective, technical solution, and advantage of the present disclosure, the disclosure is further elaborated with reference to embodiments and figures.

Embodiment 1

Figure 1:
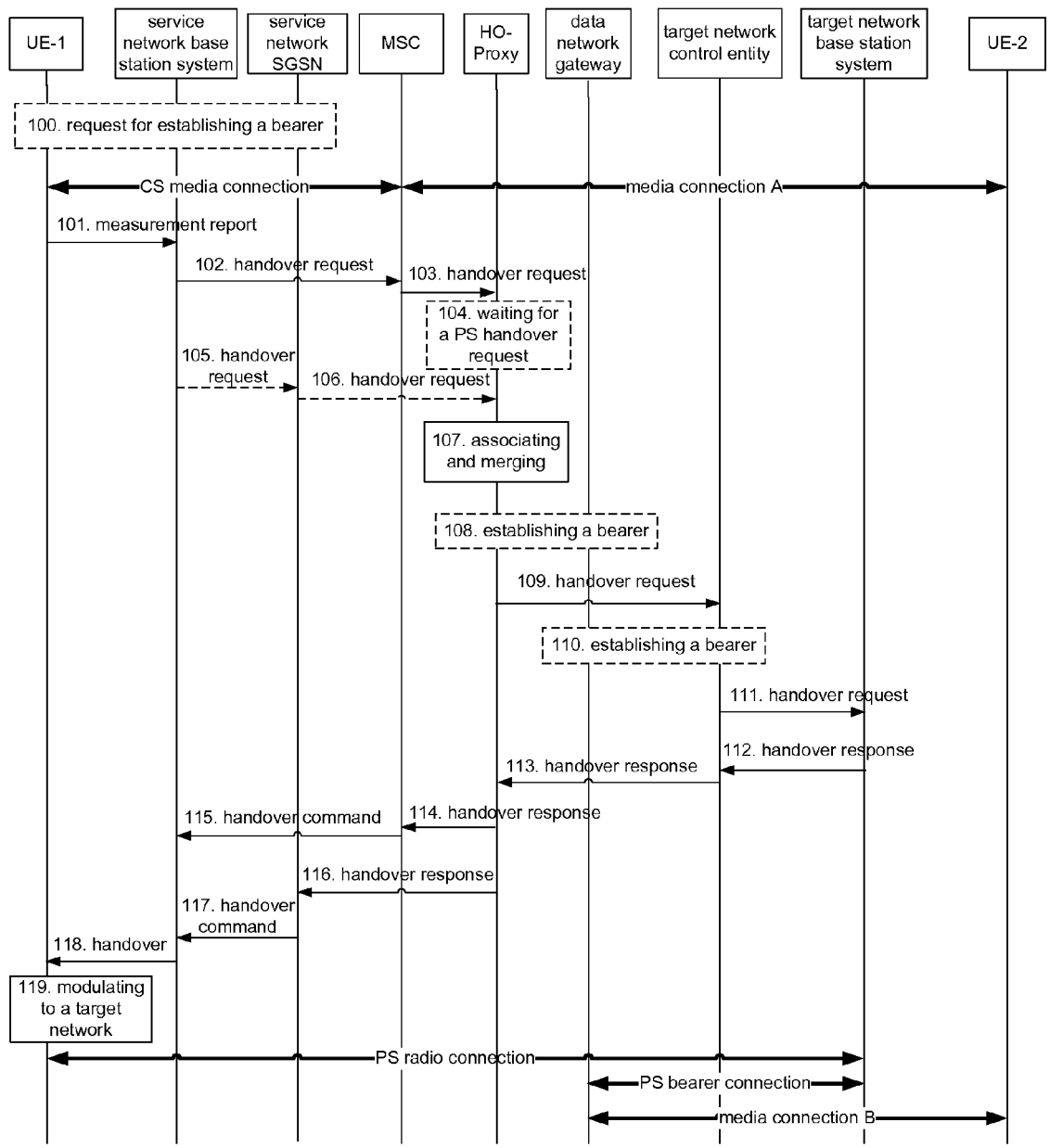
FIG. 1 is a flowchart of Embodiment 1 of a method for switching a circuit switch domain service to a packet switch domain according to the present disclosure.

FIG. 1 is a flowchart of Embodiment 1 of a method for switching a circuit switch domain service to a packet switch domain according to the present disclosure. As shown in FIG. 1, the scenario in which the example is applied is that: UE-1 establishes a session with UE-2 via a CS domain, wherein UE-1 may also have a non-voice PS domain service; when UE-1 moves to a target network (PS network), all services need to be switched to be provided by a PS domain of the target network. According to this example, the method for switching a circuit switch domain service to a packet switch domain specifically includes the following steps.

Step 100 is optional, wherein UE-1 requests a service network to establish a PS bearer, for example by sending a Bearer Resources Command message, or implements bearer establishment by interacting with the service network via an IMS network, for example by initiating an IMS session, or notifying a P-CSCF during IMS registration that a bearer needs to be established and establishing the bearer by interaction of the P-CSCF with the service network. This step may occur at any time before a handover; If UE-1 is connected to a target network first, a bearer can also be established at the target network, in which case the bearer is established via a target network base station system and a target network control entity, in which case a CS service is established after UE-1 moves to the service network, and then a subsequent step is executed thereafter.

Step 101: UE-1 sends a measurement report to a network that serves UE-1, to report cell signal strength measurement information.

Step 102: a base station subsystem of the network that serves UE-1 determines that it is more proper for UE-1 to be served by a PS domain in a target network in which a target cell is located according to signal strength measurement information of each cell in the measurement report from UE-1, and hence determines to execute a handover operation. The base station subsystem of the service network sends a Mobile Switching Center (MSC) a handover request, such as a Handover required message, the target ID of which can be set as such a target ID that the handover request can be routed by each network element (such as the MSC) of the service network to the HO-Proxy; If UE-1 further has a PS service, information indicating PS service existence is further included in the handover required message, for example carried in the target ID. The HO-Proxy can be included in the target network control entity, or in a Serving GPRS (General Packet Radio Service) support node (SGSN) or in the MSC of the service network.

Step 103: the MSC sends the Handover required message to the HO-Proxy: the MSC sends, for example, a Prep_HO Request message when the HO-Proxy is in another MSC, wherein the target ID of the Handover required message is the target ID of the received Handover required message (namely, directing to the HO-Proxy), and the Handover required message carries information indicating PS service existence, for example in the target ID; the MSC sends, for example, a CS to PS HO Request message when the HO- Proxy is in the target network control element or an SGSN, wherein when the HO-Proxy is in a Mobility Management Entity (MME), the target ID also directs to the HO-Proxy (which target ID is not necessarily the one in the received Handover required message, but can be derived according to the target ID or other field information carried by the received Handover required message); and the MSC can determine an HO-Proxy, when the HO-Proxy is in the SGSN, for example according to a configuring or connecting relation, wherein when the HO-Proxy is in an MME, information indicating PS service existence is carried in the Handover required message, for example in the target ID.

Of course, if the HO-Proxy is included in this MSC, the Handover required message sent to this MSC is simultaneously sent to the HO-Proxy, and step 103 is no longer included in the flow.

Step 104: the HO-Proxy receives the Handover required message from the CS domain (that is, from the MSC, or the message may also be from the base station subsystem when the HO-Proxy is included in the MSC); if information indicating PS service existence is carried in the Handover required message, then the HO-Proxy waits for a Handover required message from the PS domain; if the HO-Proxy is in the SGSN, the HO-Proxy can know whether a user has a PS service, and does not need to determine according to indicating information.

Step 105: if UE-1 further has a PS domain data service, the base station subsystem of the service network will also send a data domain control entity (namely, the SGSN) of the service network a Handover required message, for example, a Relocation Required message, the target ID of which may be set as such a target ID that the handover request can be routed by each network element of the service network (for example, the SGSN) to the HO-Proxy; information indicating CS service existence may be carried in the Handover required message, for example in the target ID.

Part of the information of the target ID can be used to show that the current handover is a handover from PS and CS to PS (namely to indicate CS service existence), which is indicated for example via a Routing Area Identity (RAI) or a Location Area Identity (LAI) in the target ID; for example a certain LAI and RAI is used to identify that the current handover is from PS and CS to PS. Of course, it can also be indicated by setting a dedicated handover indicating identifier in a corresponding request message.

After the HO-Proxy receives first the handover request from the PS domain, if the HO-Proxy is in an MSC, as a normal PS domain to PS domain handover request will not reach the HO-Proxy, the HO-Proxy can thereby determine that it still needs to wait for a handover request from the CS domain; or when the HO-Proxy determines that the received handover request from the PS domain carries information of "CS service existence", the HO-Proxy waits for the handover request from the CS domain; or when the HO-Proxy receives first the handover request from the CS domain, the HO-Proxy may wait for the handover request from the PS domain according to information of "PS service existence" carried in the CS handover request, thereby implementing association of the PS domain handover request with the CS domain handover request.

Of course, the present disclosure can configure identifying information for simultaneous handover of the CS and the PS domain services in both the CS and the PS domain handover requests; Thus, no matter which one, the PS or the CS domain handover request, is received first by the HO-Proxy, the HO-Proxy can determine whether the CS and the PS domain services of the UE are simultaneously switched over to the target network PS domain. That is, when the HO-Proxy determines that identifying information for simultaneous handover of the CS and the PS domain services is carried in the received handover request, the HO-Proxy sends a handover request to a corresponding network element of the target network after verifying that both CS and PS domain service handover requests are received, otherwise the HO-Proxy waits for another handover request.

Step 106: an SGSN sends the HO-Proxy a Handover required message, for example sending a Forward Relocation Request message when the HO-Proxy is in a target network control element or in another MSC different from the one in step 102, wherein the target ID of the Handover required message is that of the receive Handover required message; when the HO-Proxy is in the MSC in step 103, the SGSN can determine the HO-Proxy for example according to a configuration or connection relation.

Of course, when the HO-Proxy is included in this SGSN, the Relocation Required message sent to this SGSN is sent to the HO-Proxy simultaneously, and step 106 will no longer be in the flow.

Step 107: the HO-Proxy associates information in Handover required messages from the CS and the PS domain, that is, associates the handover requests from the CS and the PS domains using the method described in step 105; if there are Handover required messages from both domain, the HO-Proxy generates corresponding information identifiable by the target network according to related information thereof, and merges the information together as parameters of the Handover required message in step 109.

Step 108 is optional if step 100 is not executed, wherein optionally, the HO-Proxy applies before a data network gateway, namely, a Serving Gateway (SGW) and a PDN (Public Data Network) gateway (PGW) to establish a voice bearer, for example by sending a Bearer Resource Command; if step 100 is executed, the present step can also be an optional step; the HO-Proxy optionally inquires about bearer information from the target network control entity or the service network SGSN establishing the bearer for UE-1, for example by sending a PDP (Packet Data Protocol) Context Request message, thereby acquiring the bearer information.

Step 109 is after step 108 if step 108 is executed, or is after step 107 otherwise, wherein if the HO-Proxy is not in the target network control entity, the HO-Proxy sends the target network control entity, namely, a Long Term Evolution (LTE) network Mobile Management Entity (MME) or a High Speed Packet Access (HSPA) network SGSN, a handover request, for example a CS to PS Handover Request message; if the HO-Proxy is in the target network control entity, there is no step 109; if the HO-Proxy has acquired the bearer information, the bearer information acquired is carried in the handover request.

Step 110: if neither step 100 nor step 108 is executed by the HO-Proxy, the target network control entity or the HO-Proxy (if the HO-Proxy is in the target network control entity) requests to establish a voice bearer for example by sending a Bearer Resource Command; if step 100 is executed, the target network control entity or the HO-Proxy (if the HO-Proxy is in the target network control entity) inquires from the target network control entity or the service network SGSN establishing the bearer for UE-1 about the bearer information, for example by sending a PDP Context Request message, thereby acquiring the bearer information.

Step 111: the target network control entity sends the target network base station subsystem a handover request, for example sending a Handover Request message.

Step 112: the target network base station subsystem responds with a handover response message, for example sending a Handover Request Acknowledge message.

Step 113: after receiving the handover response, the target network control entity send the HO-Proxy a handover response message, for example sending a CS to PS Handover Response message.

Step 114: the HO-Proxy sends a service network MSC a handover response message, for example sending a Prep_HO Response message;

Step 115: the service network MSC sends the service network base station subsystem a handover command, for example sending a Handover Command message;

Step 116: if UE-1 further has data service, the HO-Proxy will further send the service network SGSN a handover response, for example sending a Forward Relocation Response message;

Step 117: the service network SGSN sends the service network base station subsystem a handover command, for example a Relocation Command message;

Step 118: the service network base station subsystem merges two handover commands and sends UE-1 a message which indicates handover to the target network, for example sending an HO from UTRAN/GERAN message;

Step 119. UE-1 executes the handover and modulates into the target network;

Up to this point, a service, including a voice service, is provided to UE-1 via the target network PS domain, such that the voice service of UE-1 originally in the CS domain can continue to be provided in the target network PS domain.

Embodiment 2

Figure 2:
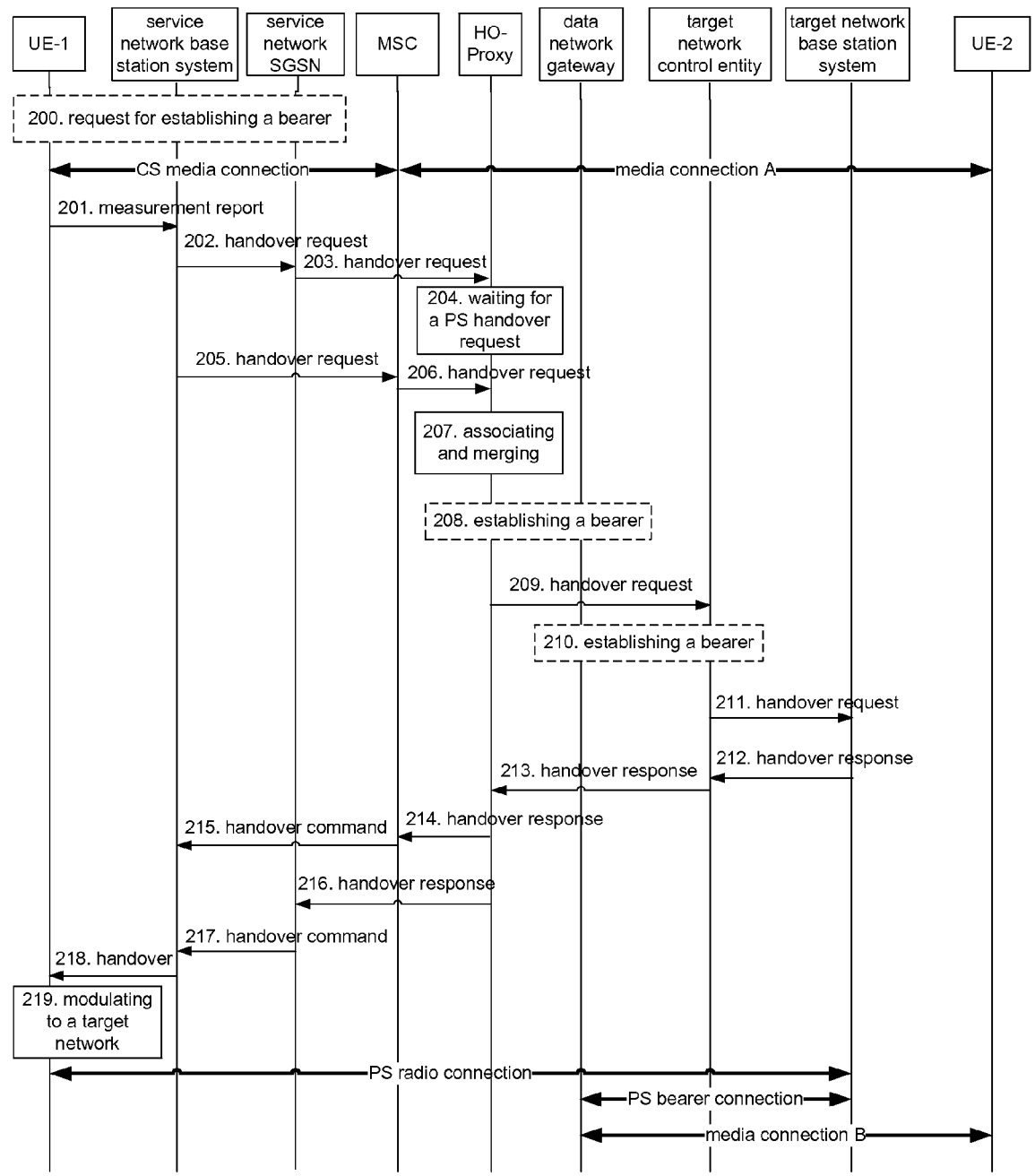
FIG. 2 is a flowchart of Embodiment 2 of the method for switching a circuit switch domain service to a packet switch domain according to the present disclosure.

FIG. 2 is a flowchart of Embodiment 2 of the method for switching a circuit switch domain service to a packet switch domain according to the present disclosure. As shown in FIG. 2, the scenario in which the example is applied is that: UE-1 establishes a session with UE-2 via a CS domain, wherein UE-1 may further have non-voice PS domain service; when UE-1 moves to a target network (PS network), all services need to be switched over to be provided by a PS domain of the target network; according to this example, the method for switching a circuit switch domain service to a packet switch domain specifically includes the following steps.

Step 200 is optional, wherein UE-1 requests a service network to establish a PS bearer, for example by sending a Bearer Resources Command message, or implements bearer establishment by interacting with the service network via an IMS network, for example by initiating an IMS session, or notifying a P-CSCF during IMS registration that a bearer needs to be established and establishing the bearer by interaction between the P-CSCF and the service network. This step may occur at any time before a handover; If UE-1 is connected to a target network first, a bearer can also be established at the target network, in which case the bearer is established via a target network base station system and a target network control entity, in which case a CS service is established after UE-1 moves to the service network, and then a subsequent step is executed thereafter.

Step 201: UE-1 sends a measurement report to a network that serves UE-1, to report cell signal strength measurement information.

Step 202: a base station subsystem of the network that serves UE-1 determines that it is more proper for UE-1 to be served by a nearby PS target network according to signal strength measurement information of each cell in the measurement report, and hence determines to execute a handover operation. The base station subsystem of the service network sends an SGSN a handover request, such as a Relocation required message, the target ID of which may be set as such a target ID that the handover request can be routed by each network element (such as the SGSN) of the service network to the HO-Proxy; information indicating CS service existence may be carried in the handover request, for example carried in the target ID. The HO-Proxy may be included in the target network control entity, or in the target network control entity or an SGSN or in an MSC.

Step 203: the SGSN sends the Handover required message to the HO-Proxy: When the HO-Proxy is in another MSC different from the one in step 205 or in the target network control entity, the SGSN sends, for example, a Forward Relocation Request message, wherein the target ID of the Handover required message is the target ID of the received Handover required message (namely, points to the HO-Proxy); The SGSN can determine, when the HO-Proxy is in the MSC in step 205, the HO-Proxy for example according to the configuring or connecting relation.

Of course, if the HO-Proxy is included in this SGSN, the Forward Relocation Required message sent to this SGSN is simultaneously sent to the HO-Proxy, and step 203 is no longer included in the flow.

Part of the information of the target ID can be used to show that the current handover is handover from PS and CS to PS (namely to indicate CS service existence), which is indicated for example via an RAI or an LAI in the target ID; for example a certain LAI and RAI is used to identify that the current handover is one of PS and CS to PS. Of course, it can also be indicated by providing a dedicated handover indicating identifier in a corresponding request message.

After the HO-Proxy receives first the handover request from the PS domain, if the HO-Proxy is in an MSC, as a normal PS domain to PS domain handover request will not reach the HO-Proxy, the HO-Proxy can thereby determine that it still needs to wait for a handover request from the CS domain; or when the HO-Proxy determines that the received handover request from the PS domain carries information of "CS service existence", the HO-Proxy waits for the handover request from the CS domain; or when the HO-Proxy receives first the handover request from the CS domain, the HO-Proxy may wait for the handover request from the PS domain according to information of "PS service existence" carried in the CS handover request, thereby implementing association of the PS domain handover request with the CS domain handover request.

Of course, the present disclosure may configure identifying information for simultaneous handover of the CS and the PS domain services in both the CS and the PS domain handover requests; Thus, no matter which one, the PS or the CS domain handover request, is received first by the HO-Proxy, the HO-Proxy can determine whether the CS and the PS domain services of the UE are simultaneously switched to the target network PS domain. That is, when the HO-Proxy determines that identifying information for simultaneous handover of the CS and the PS domain services is carried in the received handover request, the HO-Proxy sends a handover request to a corresponding network element of the target network after verifying that both CS and PS domain service handover requests are received, otherwise the HO-Proxy waits for the other handover request.

Step 204: the HO-Proxy receives the Handover required message from the PS domain, and then waits for a Handover required message from the CS domain.

Step 205: the base station subsystem of the service network also sends an MSC a Handover request (namely, Handover required message from the CS domain), for example, a Handover required message, the target ID of which may be set as such a target ID that the handover request can be routed by each network element of the service network (for example, the MSC) to the HO-Proxy; If UE-1 further has a PS service, information indicating PS service existence is also carried in the Handover required message, for example in the target ID; the HO-Proxy may be included in the target network control entity or in an SGSN or in an MSC; and if the HO-Proxy is in an SGSN, the HO-Proxy would know whether the user has a PS service without the need to determine according to indicating information.

Step 206: the MSC sends a Handover required message to the HO-Proxy, for example sending a Prep_HO Request message when the HO-Proxy is in another MSC, wherein the target ID of the Handover required message is the target ID of the received Handover required message, and the Handover required message carries information indicating PS service existence, for example in the target ID; the MSC sends, for example, a CS to PS HO Request message when the HO-Proxy is in the target network control element or an SGSN, wherein when the HO-Proxy is in an MME, the target ID (which is not necessarily the one in the received Handover required message, but can be derived according to the target ID or other field information carried by the received Handover required message) also directs to the HO-Proxy; and the MSC can determine, when the HO-Proxy is in the SGSN, the HO-Proxy for example according to the configuration or connection relation, wherein when the HO-Proxy is in an MME, the Handover required message carries information indicating PS service existence, which is carried for example in the target ID.

Of course, if the HO-Proxy is included in this MSC, the Handover required message sent to this MSC is simultaneously sent to the HO-Proxy, and step 206 is no longer included in the flow.

Steps 207 to 219 is identical to aforementioned steps 107 to 119 in FIG. 1.

Up to this point, a service, including a voice service, is provided to UE-1 via the target network PS domain, such that the voice service of UE-1 originally in the CS domain can continue to be provided in the target network PS domain. It is to be noted that so-called "association" in the present disclosure can also be called "synchronization".

The present disclosure further records a system for switching a CS domain service to a PS domain, including a service network base station system, a target network control entity, and an HO-Proxy for handover to a PS domain of a target network. A skilled person in the art should understand that both the aforementioned service network and the target network are talked about for a UE in a handover state, and those networks are all existing networks. Therefore, the structure of the system for switching a CS domain service to a PS domain according to the present disclosure is apparent and will not be illustrated further. However, the function executed by some network elements in those networks is somehow different from that executed by existing network elements, namely, the following corresponding functions, elaborated below, are added in network elements relevant to the technical solution of the present disclosure.

The service network base station system is configured to generate a Circuit Switch (CS) domain service handover request for a User Equipment (UE) and send the CS domain service handover request to the HO-Proxy when the service network base station system determines to switch a CS domain service of the UE to the PS domain of the target network; and the HO-Proxy is configured to request, after receiving the CS domain service handover request from the UE, the target network control entity to switch the CS domain service of the UE to the PS domain of the target network, or switch the CS domain service of the UE to the PS domain of the target network.

The system may further include a UE configured to establish, before the service network base station system determines to switch a CS domain service of the UE to the PS domain of the target network, a bearer at a service network or the target network via an IMS, or initiate a session, or establish a bearer directly at the service network or the target network.

Wherein, the HO-Proxy is further configured to, before requesting the target network control entity to switch the CS domain service of the UE to the PS domain of the target network, or switching the CS domain service of the UE to the PS domain of the target network, associate a PS domain service handover request for the UE with the CS domain service handover request for the UE.

Wherein, the service network base station system is further configured to make the CS domain service handover request for the UE carry identifying information indicating whether the UE has a PS domain service.

Wherein, when the UE further has a PS domain service, the service network is further configured to send a PS domain service handover request for the UE to the HO-Proxy; and the HO-Proxy further requests the target network control entity to switch the CS domain service and the PS domain service of the UE to the PS domain of the target network; or the HO-Proxy further switches the CS domain service and the PS domain service of the UE to the PS domain of the target network.

Wherein, identifying information indicating that the UE has a CS domain service is carried in the PS domain service handover request for the UE sent by the service network base station system.

Wherein, the HO-Proxy is further configured to determine that the UE further has a CS domain service when the HO-Proxy receives the PS domain service handover request for the UE.

Wherein, the HO-Proxy is further configured to determine that the UE further has a CS domain service according to the identifying information indicating that the UE has a CS domain service in the PS domain service handover request when the HO-Proxy receives the PS domain service handover request for the UE.

Wherein, the HO-Proxy is further configured to determine whether the UE further has a PS domain service according to the identifying information indicating whether the UE has a PS domain service in the CS domain service handover request when the HO-Proxy receives the CS domain service handover request for the UE.

Wherein, the service network base station system is further configured to: make the CS domain service handover request carry information that can be associated with the HO-Proxy, and send the CS domain service handover request; or send the CS domain service handover request to the HO-Proxy; or send the CS domain service handover request to a service network Mobile Switching Center (MSC), which sends a CS domain service handover request to the HO-Proxy.

Wherein, the service network base station system is further configured to: make the CS domain service handover request and the PS domain service handover request carry information that can be associated with the HO-Proxy, and send the CS domain service handover request and/or the PS domain service handover request; or send the CS domain service handover request to the HO-Proxy, and send the PS domain service handover request to a service network Serving GPRS (General Packet Radio Service) support node (SGSN), which sends a PS domain service handover request to the HO-Proxy; or send the CS domain service handover request to a service network Mobile Switching Center (MSC), which sends a CS domain service handover request to the HO-Proxy; and send the PS domain service handover request to the HO-Proxy.

Wherein, when the UE does not have a PS domain service, the HO-Proxy further inquires about bearer information from the target network control entity or a service network Serving GPRS (General Packet Radio Service) support node (SGSN) that establishes the bearer for the UE, executes a PS domain handover operation, and uses the bearer established by the UE to serve a service of the UE originally in the CS domain; or when the UE has a PS domain service, the HO-Proxy further executes a PS handover operation, and uses the bearer established by the UE to serve a service of the UE originally in the CS domain.

The aforementioned are merely preferred embodiments of the disclosure and are not intended to limit the scope of the disclosure.

The invention claimed is:

1. A method for switching a circuit switch domain service to a packet switch domain, comprising:
    receiving, by a handover proxy (HO-Proxy), a Circuit Switch (CS) domain service handover request for a UE when a service network base station system determines to switch a CS domain service of a UE to a PS domain of a target network; and
    requesting, by the HO-Proxy, a target network control entity to switch the CS domain service of the UE to the PS domain of the target network, or switching, by the HO-Proxy, the CS domain service of the UE to the PS domain of the target network.

2. The method according to claim 1, further comprising: before the service network base station system determines to switch the CS domain service of the UE to the PS domain of the target network,
    establishing, by the UE, a bearer at a service network or the target network via an IP Multimedia Core Network Subsystem (IMS), or initiating, by the UE, a session, or establishing, by the UE, a bearer directly at the service network or the target network.

3. The method according to claim 1, further comprising:
    receiving, by the HO-Proxy, a PS domain service handover request for the UE from the service network base station system when the UE further has a PS domain service; and
    requesting, by the HO-Proxy, the target network control entity to switch a CS domain service and a PS domain service of the UE to the PS domain of the target network, or switching, by the HO-Proxy, a CS domain service and a PS domain service of the UE to the PS domain of the target network.

4. The method according to claim 3, further comprising:
    carrying identifying information indicating whether the UE has a CS domain service in the PS domain service handover request for the UE sent by the service network base station system;
    carrying identifying information indicating whether the UE has a PS domain service in the CS domain service handover request for the UE.

5. The method according to claim 1, wherein a PS domain service handover request and a CS domain service handover request for the UE received by the HO-Proxy is:

a PS domain service handover request and a CS domain service handover request for the UE are triggered by a CS domain service handover request and a PS domain service handover request that are sent by the service network base system and carry information that can be associated with the HO-Proxy; or
    a CS domain service handover request for the UE is a CS domain service handover request sent by the service network base station system, and a PS domain service handover request for the UE is a PS domain service handover request sent by a service network Serving GPRS (General Packet Radio Service) support node (SGSN) and the PS domain service handover request sent by the SGSN is triggered by a PS domain service handover request sent by the service network base station system; or
    a CS domain service handover request for the UE is a CS domain service handover request sent by a service network Mobile Switching Center (MSC) and the CS domain service handover request sent by the MSC is triggered by a CS domain service handover request sent by the service network base station system, and a PS domain service handover request for the UE is a PS domain service handover request sent by the service network base station system.

6. The method according to claim 1, wherein a Circuit Switch (CS) domain service handover request for the UE received by the HO-proxy is:
    a CS domain service handover request for the UE is triggered by a CS domain service handover request that is sent by the service network base system and carries information that can be associated with the HO-Proxy; or
    a CS domain service handover request for the UE is a CS domain service handover request sent by the service network base station system; or
    a CS domain service handover request for the UE is a CS domain service handover request sent by a service network Mobile Switching Center (MSC), and the CS domain service handover request sent by the MSC is triggered by a CS domain service handover request sent by the service network base station system.

7. The method according to claim 1, wherein switching, by the HO-Proxy, the CS domain service of the UE to the PS domain of the target network is:
    when the UE does not have a PS domain service, inquiring, by the HO-Proxy, about bearer information from the target network control entity or a service network Serving GPRS (General Packet Radio Service) support node (SGSN) that establishes the bearer for the UE, executing, by the HO-Proxy, a PS domain handover operation, and using, by the HO-Proxy, the bearer established by the UE to serve a service of the UE originally in the CS domain; or
    when the UE has a PS domain service, executing, by the HO-Proxy, a PS handover operation, and using, by the HO-Proxy, the bearer established by the UE to serve a service of the UE originally in the CS domain.

8. The method according to claim 1, wherein the target network control entity is a Mobility Management Entity (MME) or a Serving GPRS (General Packet Radio Service) support node (SGSN), and the HO-Proxy is a Mobile Switching Center (MSC) or an SGSN or a target network control entity.

9. A system for switching a circuit switch domain service to a packet switch domain, comprising a service network base station system, a target network control entity, and a handover proxy (HO-Proxy) for handover to a Packet Switch (PS) domain of a target network, wherein the service network base station system is configured to generate a Circuit Switch (CS) domain service handover request for a User Equipment (UE) and send the CS domain service handover request to the HO-Proxy when the service network base station system determines to switch a CS domain service of the UE to the PS domain of the target network; and the HO-Proxy is configured to request, after receiving the CS domain service handover request from the UE, a target network control entity to switch the CS domain service of the UE to the PS domain of the target network, or switch the CS domain service of the UE over to the PS domain of the target network.

10. The system according to claim 9, further comprising a UE configured to: before the service network base station system determines to switch the CS domain service of the UE to the PS domain of the target network, establish a bearer at a service network or the target network via an IP Multimedia Core Network Subsystem (IMS), or initiate an IMS session, or establish a bearer directly at the service network or the target network.

11. The system according to claim 9, wherein when the UE further has a PS domain service, the service network is further configured to send a PS domain service handover request for the UE to the HO-Proxy; and the HO-Proxy further requests the target network control entity to switch the CS domain service and the PS domain service of the UE to the PS domain of the target network, or further switches the CS domain service and the PS domain service of the UE to the PS domain of the target network.

12. The system according to claim 11, wherein the service network base station system is further configured to: make the CS domain service handover request and the PS domain service handover request carry information that can be associated with the HO-Proxy, and send the CS domain service handover request and/or the PS domain service handover request; or send the CS domain service handover request to the HO-Proxy, and send the PS domain service handover request to a service network Serving GPRS (General Packet Radio Service) support node (SGSN), which sends a PS domain service handover request to the HO-Proxy; or send the CS domain service handover request to a service network Mobile Switching Center (MSC), which sends a CS domain service handover request to the HO-Proxy; and send the PS domain service handover request to the HO-Proxy.

13. The system according to claim 9, wherein the service network base station system is further configured to: make the CS domain service handover request carry information that can be associated with the HO-Proxy, and send the CS domain service handover request; or send the CS domain service handover request to the HO-Proxy; or send the CS domain service handover request to a service network Mobile Switching Center (MSC), which sends a CS domain service handover request to the HO-Proxy.

14. The system according to claim 9, wherein when the UE does not have a PS domain service, the HO-Proxy further inquires about bearer information from the target network control entity or a service network Serving GPRS (General Packet Radio Service) support node (SGSN) that establishes the bearer for the UE, executes a PS domain handover operation, and uses the bearer established by the UE to serve a service of the UE originally in the CS domain; or when the UE has a PS domain service, the HO-Proxy further executes a PS handover operation, and uses the bearer established by the UE to serve a service of the UE originally in the CS domain.

15. A handover proxy (HO-Proxy), configured to:

receive a Circuit Switch (CS) domain service handover request for a UE when a service network base station system determines to switch a CS domain service of a UE to a PS domain of a target network; and request a target network control entity to switch the CS domain service of the UE to the PS domain of the target network, or switch the CS domain service of the UE to the PS domain of the target network.

16. The HO-Proxy according to claim 15, further configured to:

receive a CS domain service handover request which is triggered by a CS domain service handover request that is sent by the service network base system and carries information that can be associated with the HO-Proxy; or receive a CS domain service handover request sent by the service network base station system; or receive a CS domain service handover request sent by a service network Mobile Switching Center (MSC), wherein the CS domain service handover request sent by the MSC is triggered by a CS domain service handover request sent by the service network base station system.

17. The HO-Proxy according to claim 15, further configured to:

when the UE does not have a PS domain service, inquire about bearer information from the target network control entity or a service network Serving GPRS (General Packet Radio Service) support node (SGSN) that establishes the bearer for the UE, execute a PS domain handover operation, and use the bearer established by the UE to serve a service of the UE originally in the CS domain; or when the UE has a PS domain service, execute a PS handover operation, and use the bearer established by the UE to serve a service of the UE originally in the CS domain.

\* \* \* \* \*